US011927107B2

(12) United States Patent
Cistac et al.

(10) Patent No.: US 11,927,107 B2
(45) Date of Patent: Mar. 12, 2024

(54) TOOL AND METHOD FOR DISASSEMBLING AND MOVING A TRV-TYPE TURBINE CASING OF AN AIRCRAFT TURBINE ENGINE

(71) Applicant: SAFRAN AIRCRAFT ENGINES, Paris (FR)

(72) Inventors: Sébastien Georges Cistac, Moissy-Cramayel (FR); Olivier Jean Caudron, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 31 days.

(21) Appl. No.: 17/627,185

(22) PCT Filed: Jul. 16, 2020

(86) PCT No.: PCT/FR2020/051275
§ 371 (c)(1),
(2) Date: Jan. 14, 2022

(87) PCT Pub. No.: WO2021/009464
PCT Pub. Date: Jan. 21, 2021

(65) Prior Publication Data
US 2022/0275735 A1 Sep. 1, 2022

(30) Foreign Application Priority Data

Jul. 17, 2019 (FR) ...................................... 1908063

(51) Int. Cl.
*F01D 25/28* (2006.01)
*B64F 5/10* (2017.01)
(52) U.S. Cl.
CPC .............. *F01D 25/285* (2013.01); *B64F 5/10* (2017.01); *F05D 2220/323* (2013.01); *F05D 2230/70* (2013.01)

(58) Field of Classification Search
CPC ...... F01D 25/285; B64F 5/10; F05D 2230/70; F05D 2220/323
See application file for complete search history.

(56) References Cited

U.S. PATENT DOCUMENTS

| 2012/0228254 A1* | 9/2012 | Holmes | ................. B66C 23/163 212/242 |
| 2012/0233845 A1* | 9/2012 | Gerengi | .................... F23R 3/00 29/466 |

(Continued)

FOREIGN PATENT DOCUMENTS

FR     3 051 833 A1    12/2017

OTHER PUBLICATIONS

English translation of Written Opinion dated Sep. 25, 2020, issued in corresponding International Application No. PCT/FR2020/051275, filed Jul. 16, 2020, 4 pages.

(Continued)

*Primary Examiner* — Christopher J Besler
(74) *Attorney, Agent, or Firm* — CHRISTENSEN O'CONNOR JOHNSON KINDNESS PLLC (57) ABSTRACT

A TRV-type turbine casing includes inner and outer annular shrouds that extend one inside the other and about the same axis and are connected together by arms. A tool for disassembling and moving the casing has a lower carriage for moving the tool, and an upper plate to be attached to the turbine casing. The plate is supported by the carriage and includes first members that cooperate with a first annular flange of one of the shrouds to support the casing and axially immobilize the casing relative to the tool. The plate further includes second members that cooperate with a second annular flange of the other shroud in order to prevent and/or guide the rotation of the casing about the axis.

16 Claims, 9 Drawing Sheets

(56) References Cited

U.S. PATENT DOCUMENTS

2015/0113787 A1    4/2015  Holay et al.
2017/0297744 A1   10/2017  Drieu et al.
2018/0156071 A1*  6/2018  Mogle, II ................. F23R 3/44

OTHER PUBLICATIONS

International Preliminary Report on Patentability dated Jan. 18, 2022, issued in corresponding International Application No. PCT/FR2020/051275, filed Jul. 16, 2020, 6 pages.
International Search Report dated Sep. 25, 2020, issued in corresponding International Application No. PCT/FR2020/051275 filed Jul. 16, 2020, 5 pages total.
Written Opinion dated Sep. 25, 2020, issued in corresponding International Application No. PCT/FR2020/051275 filed Jul. 16, 2020, 5 pages.

* cited by examiner

TOOL AND METHOD FOR DISASSEMBLING AND MOVING A TRV-TYPE TURBINE CASING OF AN AIRCRAFT TURBINE ENGINE

FIELD OF THE DISCLOSURE

The present disclosure relates to a tool and a method for disassembling and moving a TRV-type turbine casing of an aircraft turbine engine.

BACKGROUND

The prior art comprises in particular the documents US-A1-2015/113787, FR-A1-3051833 and US-A1-2017/297744.

A turbine engine generally comprises, from upstream to downstream, in the direction of the flows in the turbine engine, a fan and a gas generator comprising one or more compressors, a combustion chamber and one or more turbines. In a double-flow turbine engine, the airflow which passes through the fan is divided into two portions, one of which, referred to as primary flow, enters the gas generator and is compressed in the compressor or the compressors, mixed with fuel and burned in the combustion chamber to form combustion gases which are then expanded in the turbine or the turbines. The expansion of the combustion gases in the turbines allows to drive their rotors, which in turn drive the rotors of the compressors and of the fan. Another portion of the airflow, referred to as secondary flow, flows around the gas generator and is mixed with the combustion gases leaving the turbines.

At the downstream end of the gas generator, the turbine engine comprises a turbine casing of the TRV-type, which is the acronym for Turbine Rear Vane. A turbine engine casing is generally an annular part that extends around the longitudinal axis of the turbine engine, which coincides with the axes of rotation of its rotors. A turbine casing of the TRV-type is mounted downstream of the turbines and comprises two annular shells, respectively internal and external, extending one inside the other and around a same axis and connected together by arms.

The shells of the turbine casing define between them an annular flow duct for the combustion gases leaving the turbines. The arms ensure the connection of the shells together and are arranged around the axis of the casing. Some arms can be tubular to lighten the casing and allow the passage of auxiliaries, such as cables or conduits, through the duct so as not to disturb the flow of the combustion gases.

The shells are generally cylindrical or frustoconical in shape and comprise an annular fastening flange at each of their axial ends. An annular flange generally comprises an annular rim oriented perpendicularly to its axis of revolution and comprising an annular row of orifices for the passage of fastening screws of this flange to another flange. The flanges of the turbine casing can be circular or festooned.

The upstream flange of the external shell of the turbine casing is attached to a downstream flange of a turbine casing, for example low-pressure, of the turbine engine. The downstream flange of this external shell is attached to an upstream flange of a nozzle of the turbine engine.

The upstream flange of the internal shell of the turbine casing is attached to a downstream flange of a cowling of the turbine engine. The downstream flange of this internal shell is attached to an upstream flange of an exhaust cone of the turbine engine.

Figure 1:
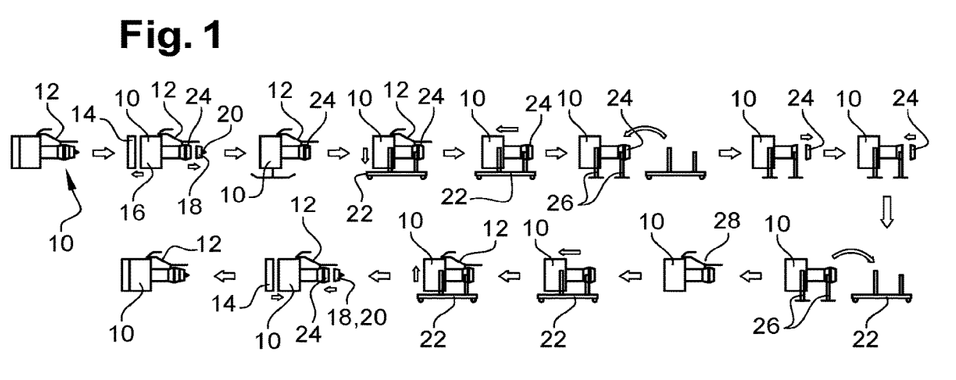
FIG. 1 illustrates in a very schematic manner the steps of a method for disassembling a turbine casing of an aircraft turbine engine, according to the prior art.

FIG. 1 shows very schematically the steps of disassembling a turbine casing of a turbine engine, when the latter is mounted under a wing of an aircraft.

The turbine engine 10 is attached to the wing 12. Its air inlet sleeve 14 located upstream of the fan 16, the nozzle 18 and the exhaust cone 20 located downstream of the turbine casing 24 are removed. The turbine engine 10 is disassembled from the wing 12 and transported by a carriage 22 to a docking station 26 where the turbine casing 24 is removed. After maintenance, the turbine casing 24 is reassembled and the turbine engine 10 is moved by means of the carriage 22 to a test bench 28. After validation, the turbine engine 10 is disassembled from the test bench 28 and moved by means of the carriage 22 to the aircraft to be attached to its wing 12. The air inlet sleeve 14, the nozzle 18 and the exhaust cone 20 are reassembled on the turbine engine 10.

It is understandable that these operations are long and complex to carry out. There is therefore a need to simplify the disassembling and the maintenance of the turbine casing by allowing these steps to be performed directly under the wing of the aircraft.

SUMMARY

The present disclosure relates to a tool for disassembling and moving a TRV-type turbine casing of an aircraft turbine engine, this turbine casing comprising two annular shells, internal and external respectively, which extend one inside the other and about a same axis and are connected together by arms, characterised in that the tool comprises:
  a lower carriage for moving the tool, and
  an upper plate for attaching to the turbine casing, this plate being supported by the carriage and comprising first members configured to cooperate with a first annular flange of one of the shells in order to support the casing and axially immobilize same with respect to the tool, and second members configured to cooperate with a second annular flange of the other of the shells in order to rotatably guide and/or block the casing about [[said]] the axis.

The tool is thus adapted to be attached to the turbine casing so that it can be immobilized and supported. The tool is also equipped with a moving carriage which avoids the transfer of the casing from one tool to another. The same tool is used to disassemble and move the turbine casing, as well as to reassemble it.

According to the disclosure, the first members comprise hooks which are each connected to a knob and movable by means of the knob from a first unlocking position to a second position for locking and immobilizing the casing.

The tool according to the disclosure may comprise one or more of the following characteristics, taken alone or in combination with each other:
  the first members can cooperate with the internal shell, or alternatively the external shell,
  the second members can cooperate with the external shell, or alternatively the internal shell,
  the first members are supported by a ring sector of the upper plate, this ring sector being configured to be applied axially to the first flange, or alternatively to a flange of the other of the shells;
  each hook is generally L-shaped and comprises a first branch substantially parallel to the axis and configured to be engaged radially within the first flange (or alternatively on the flange of the other of the shells), and a second branch movable from the first position, in which it extends substantially tangentially or radially inwardly with respect to the axis, to the second position, in which it extends radially outwardly to hold this flange axially tight;

the second members comprise rods substantially parallel to the axis and configured to be engaged in bolt passage orifices of the second flange;

the tool comprises two rods spaced apart from each other by a predetermined angle, preferably between 90 and 180°, and for example about 90°, with respect to the axis; this spacing allows to give to the rods a centring function;

the plate comprises a stationary lower portion connected to the carriage, and an upper portion which is movable with respect to the stationary portion, and which comprises at least one portion of the first and second members;

the movable portion is configured to be moved in axial translation in a direction parallel to the axis;

the upper portion of the plate comprises two side branches oriented in opposite directions and whose opposite ends are connected to each other by the ring sector;

the carriage is provided with wheels for moving the tool over a floor;

the carriage comprises adjusting elements of a height of the plate and at least one pivoting angle of the plate about an axis.

The present disclosure further relates to a method for disassembling and moving a TRV-type turbine casing of an aircraft turbine engine, in particular when the turbine engine and the casing are located under a wing of an aircraft, this method using a tool as described above and comprising the steps of:

aligning the plate of the tool with the turbine casing, the tool being located on the side of a downstream end of the casing, moving the tool towards the casing until the second members cooperate with the second flange of the external shell in order to rotatably guide and/or block the casing about its axis in relation to the tool, axially immobilizing the casing on the plate by means of the first members of the tool, and disassembling the casing and removing the casing by moving the tool supporting the casing.

DESCRIPTION OF THE DRAWINGS

Further characteristics and advantages of the disclosure will become apparent from the following detailed description, for the understanding of which reference is made to the attached drawings in which.

DETAILED DESCRIPTION

Figure 2:
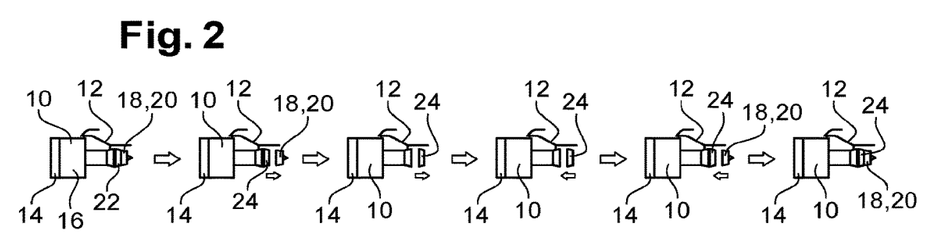
FIG. 2 illustrates in a very schematic manner the steps of a method for disassembling a turbine casing of an aircraft turbine engine, which can be implemented with the present disclosure.

As discussed above, there is a need to simplify the dismantling and the maintenance of a turbine casing by allowing its disassembling directly from under the wing 12 of an aircraft. This is schematically represented in FIG. 2 in which the references used are the same as those used in reference to FIG. 1.

Figure 3:
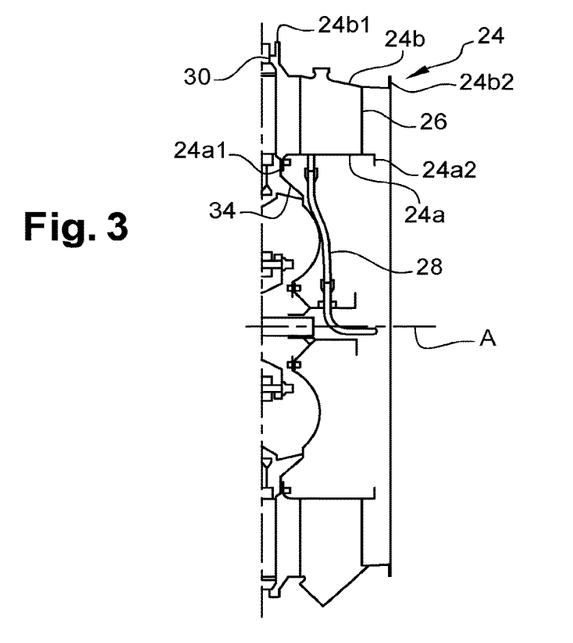
FIG. 3 is a schematic axial section view of the downstream end of an aircraft turbine engine, and shows a TRV-type turbine casing.

FIG. 3 shows schematically a TRV-type turbine casing 24. This casing 24 comprises two annular shells, respectively internal 24a and external 24b, extending one inside the other and about a same axis A which is the longitudinal axis of the turbine engine 10 and its rotors. The two shells 24a, 24b are connected together by substantially radial arms 26, at least some of which may be tubular to lighten the casing and allow the passage of auxiliaries 28, such as cables or conduits.

The shells 24a, 24b define between them an annular flow duct for the combustion gases leaving the turbines of the turbine engine located just upstream. This duct is passed through by the arms 26.

The shells 24a, 24b are cylindrical or frustoconical in shape and comprise at each of their axial ends an annular fastening flange, which may be circular or festooned.

The upstream flange 24b1 of the external shell 24b is attached to a downstream flange of a turbine casing 30, for example low-pressure, of the turbine engine. The downstream flange 24b2 of this external shell 24b is attached to an upstream flange of the nozzle 18 (FIG. 3). The upstream flange 24a1 of the internal shell 24a is attached to a downstream flange of a cowling 34 of the turbine engine. This cowling 34 may be integrated completely integral or not with the casing 24. The downstream flange 24a2 of the internal shell 24a is attached to an upstream flange of the exhaust cone 20 (FIG. 3).

Figure 11:
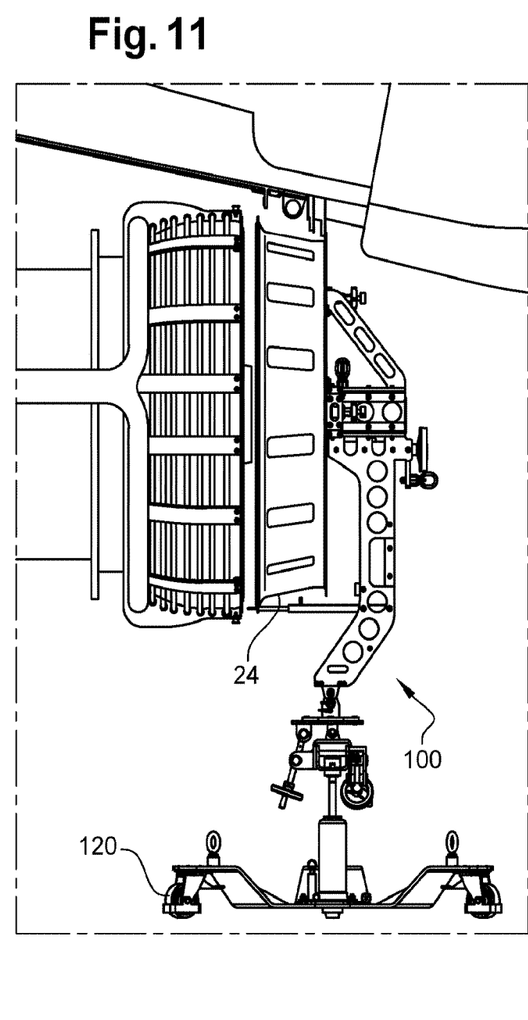
FIG. 11 is a schematic perspective view of the downstream end of the turbine engine of FIG. 4, and shows another step of a disassembling method according to the disclosure.
Figure 11A:
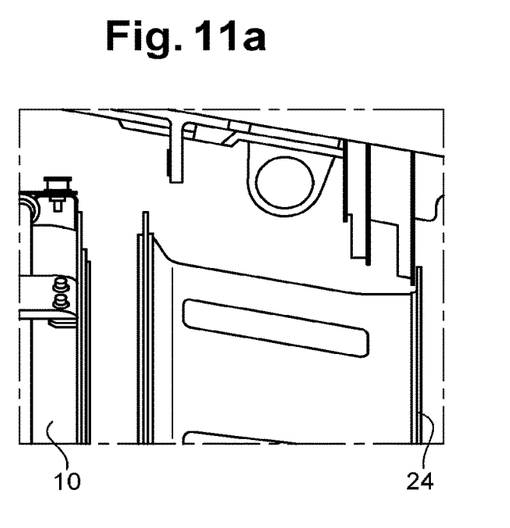
FIG. 11a is an enlarged view of a detail of FIG. 11.
Figure 12:
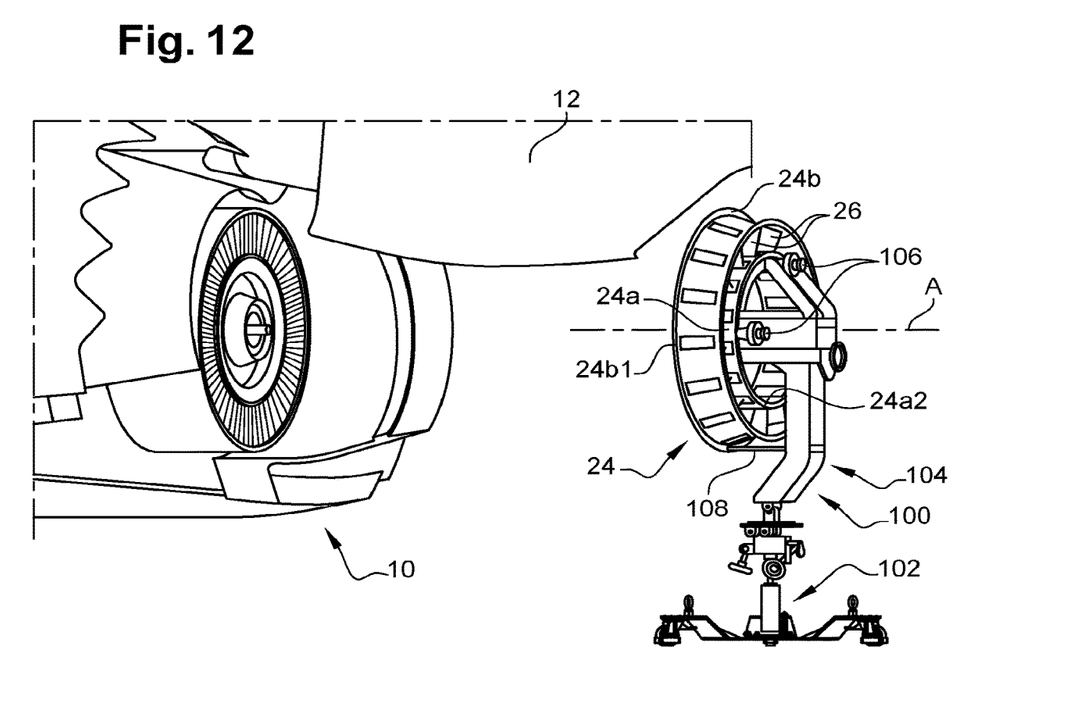
FIG. 12 is a schematic perspective view of the downstream end of the turbine engine of FIG. 4, and shows another step of a disassembling method according to the disclosure.
Figure 13:
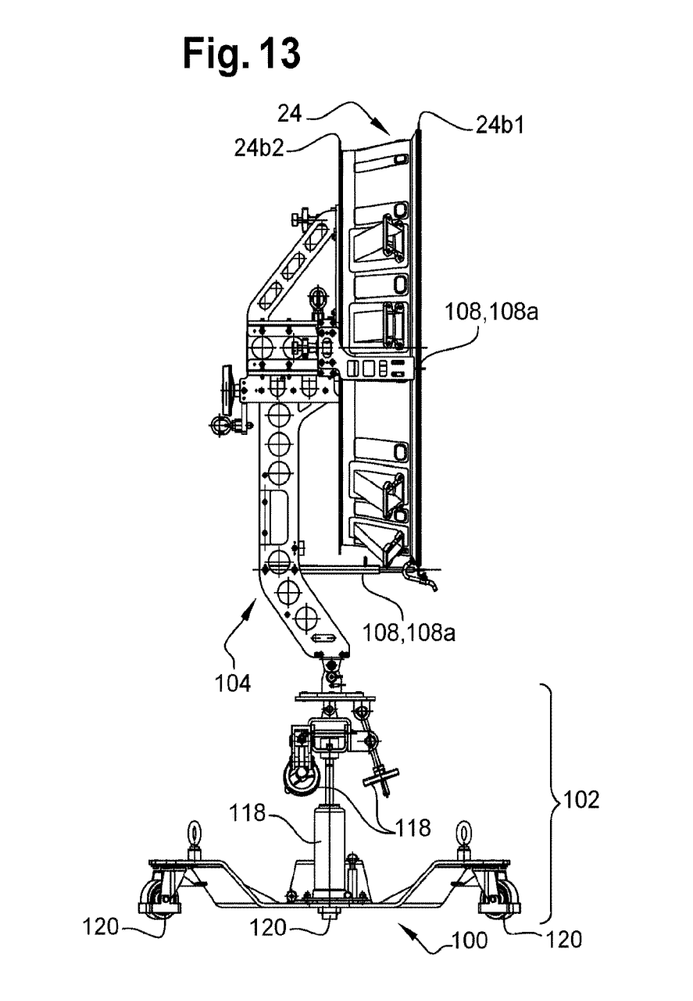
FIG. 13 is a schematic perspective side view of a tool according to an embodiment of the disclosure.

FIGS. 4 to 12 show steps of a method for disassembling the turbine casing 24, and FIG. 13 and following show an embodiment of a tool 100 for implementing this method.

Figure 4:
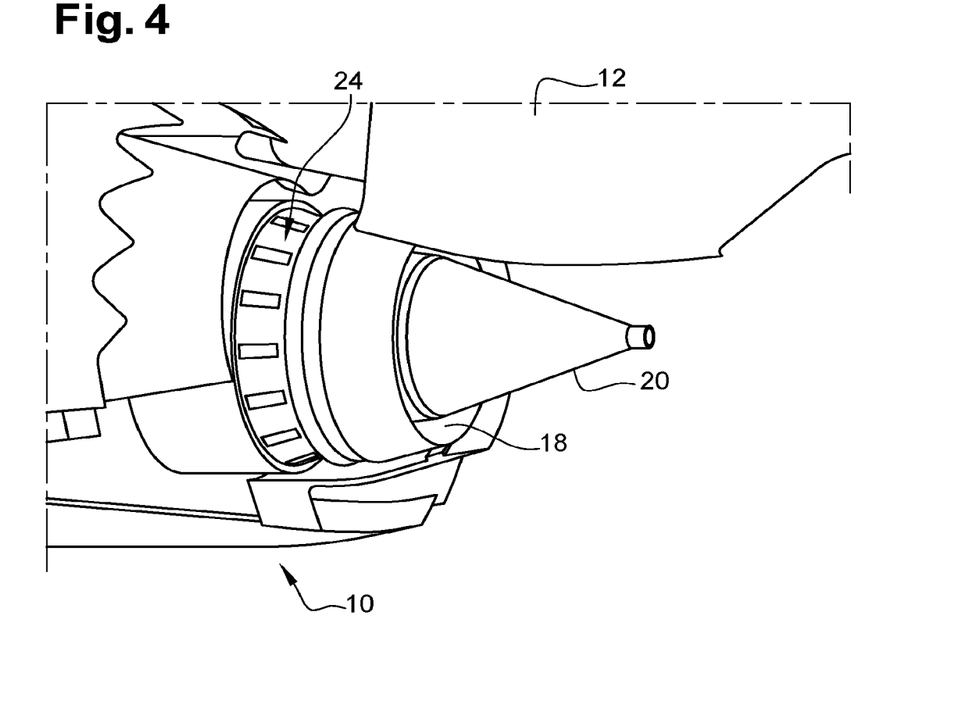
FIG. 4 is a schematic perspective view of the downstream end of an aircraft turbine engine, and shows a step in a disassembling method according to the disclosure.

A first step illustrated in FIG. 4 as well as in the second drawing of FIG. 2 (from the left) consists in dismantling the nozzle 18 and the exhaust cone 20 of the turbine engine 10. The turbine engine 10 is attached to the wing 12 of the aircraft and both of these elements are removed from downstream of the turbine engine 10. To do this, the screws or bolts attaching these elements are unscrewed and removed, which allows them to be disengaged from the turbine engine and removed. More specifically, the screws for attaching the flange of the nozzle 18 to the flange 24b2 of the shell 24b are removed to extract the nozzle 18 by axial translation towards downstream, and then the screws for attaching the flange of the cone 20 to the flange 24a2 of the shell 24a are removed to extract the cone 20 by axial translation towards downstream.

Figure 5:
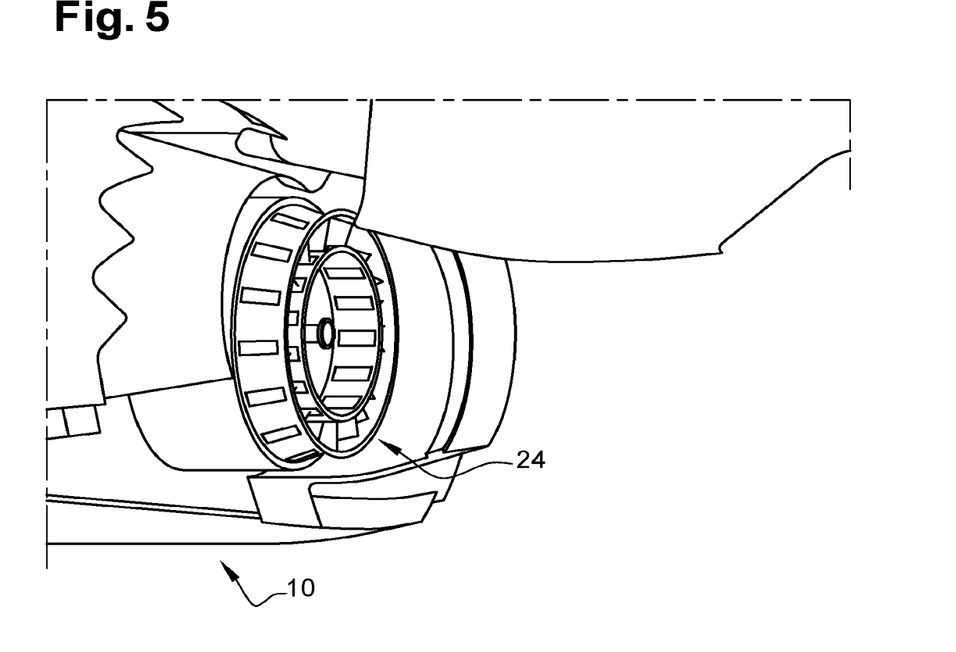
FIG. 5 is a schematic perspective view of the downstream end of the turbine engine of FIG. 4, and shows another step of a disassembling method according to the disclosure.
Figure 6:
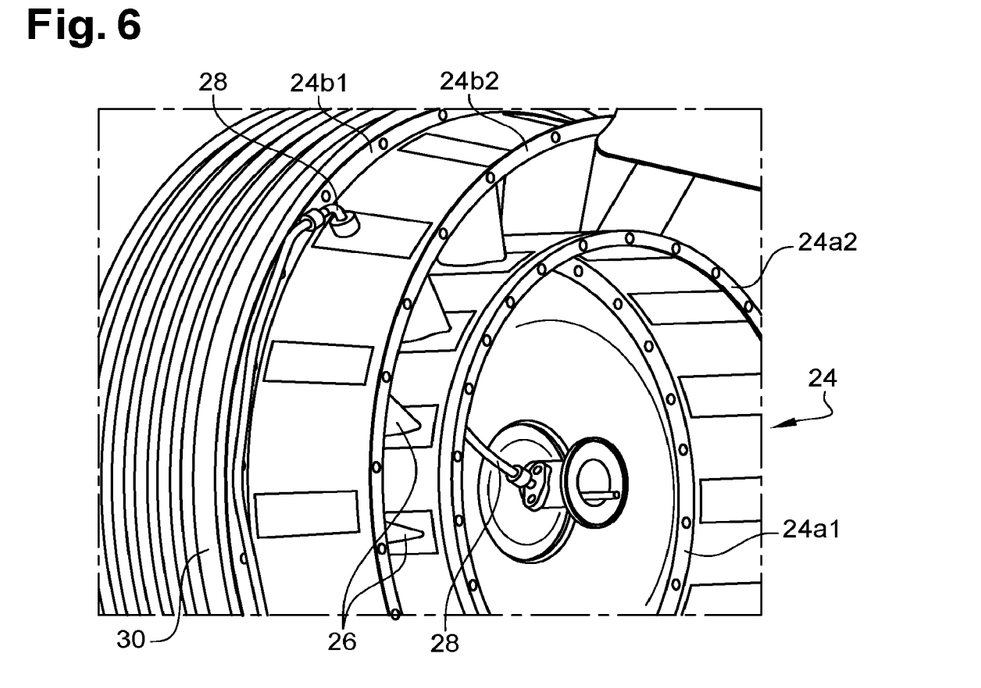
FIG. 6 is another schematic perspective view of the downstream end of the turbine engine of FIG. 5.
Figure 7:
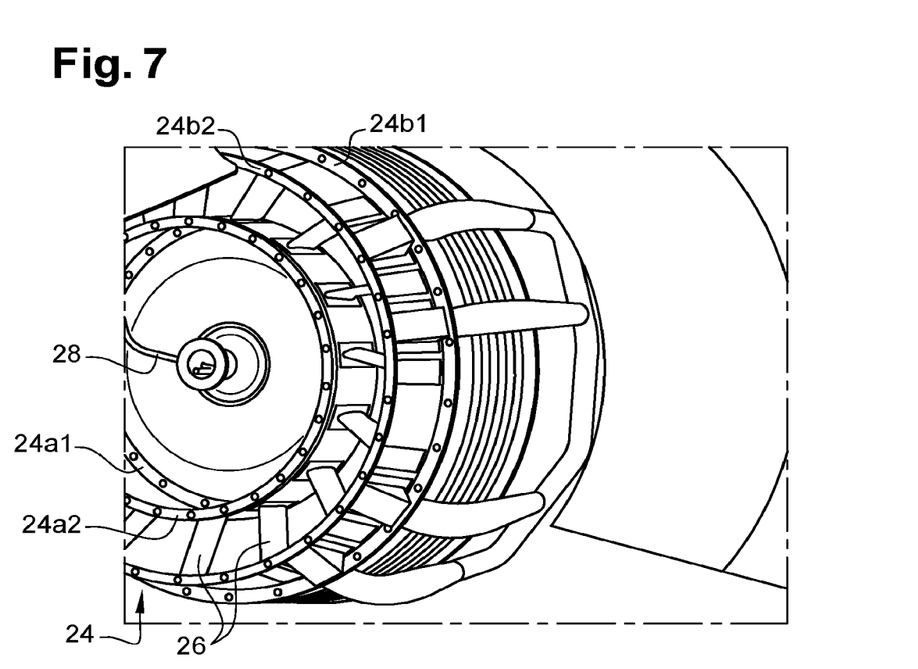
FIG. 7 is another schematic perspective view of the downstream end of the turbine engine of FIG. 5.

This allows to clear the downstream side of the turbine casing 24, as shown in FIGS. 5 to 7. These figures allow to show details of the turbine casing 24 and of the turbine engine. In the example shown, the flange 24b2 extends radially outwardly and is festooned. The flange 24a2 extends radially inwardly and is also festooned. The flange 24b1 is similar to the flange 24b2, and the flange 24a1 is circular in the example shown. Each flange comprises alternating solid and hollow portions, the solid portions comprising orifices for passage of the screws for attaching the flanges.

It can also be seen from these figures that the screws for attaching the flanges 24a1, 24b1 are accessible from downstream and can therefore be unscrewed to disengage the turbine casing 24 from the rest of the turbine engine. The flange 24b1 extends radially outward and its screws are accessible from the exterior of the shell 24b, and the flange 24a1 extends radially inward and its screws are accessible from the interior of the shell 24a.

The auxiliaries 28 extending through the arms 26 are accessible from both the interior and the exterior of the turbine casing 24 (FIG. 6) and their ends may be disengaged from other elements to allow their removal and the disassembling of the turbine casing 24.

More specifically, FIGS. 8 to 12 show the disassembling and the moving of the turbine casing 24 by means of the tool 100 which is shown in FIG. 13 and following.

Essentially, this tool 100 comprises two portions namely:
a lower carriage 102 for moving the tool, and
an upper plate 104 for attaching to the turbine casing 24, the plate 104 being supported by the carriage 102.

Figure 15:
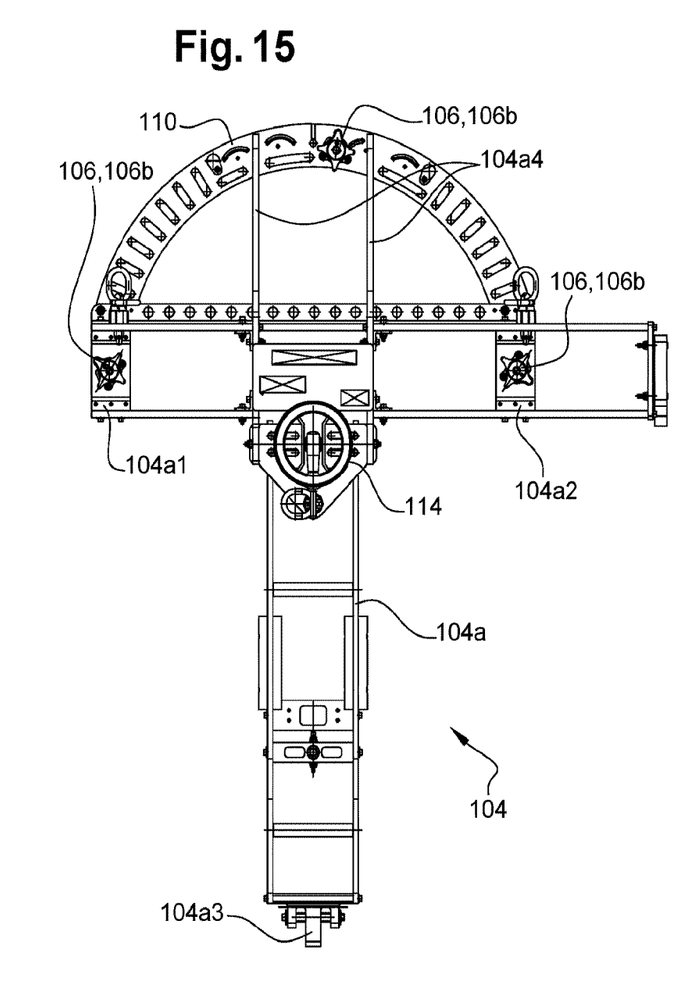
FIG. 15 is a schematic rear perspective view of a plate of the tool of FIG. 13.
Figure 16:
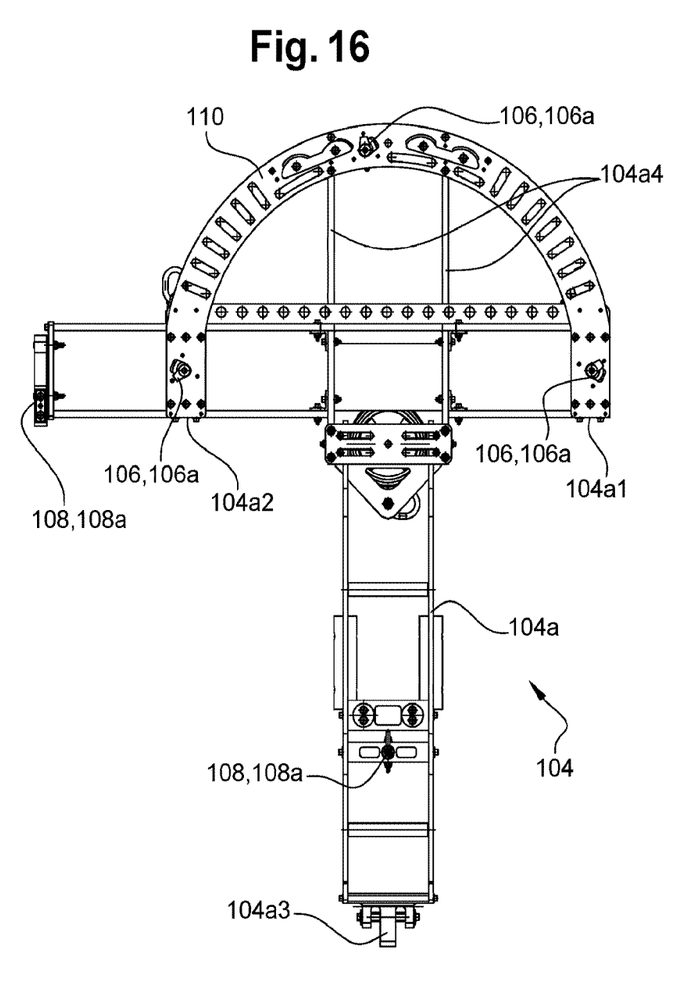
FIG. 16 is a schematic front perspective view of a plate of the tool of FIG. 13.

The plate 104 is shown alone in FIGS. 15 and 16. It comprises first members 106 configured to cooperate with one of the flanges of the turbine casing 24 in order to immobilize it axially with respect to the tool, and second members 108 configured to cooperate with another flange of the turbine casing 24 in order to block it in rotation about its axis A and to ensure its centring with respect to this axis.

In the illustrated example, the members 106 are configured to cooperate with the flange 24a2 and the members 108 are configured to cooperate with the flange 24b1.

Here, the members 106 are supported by a ring sector 110 of the plate 104, this ring sector 110 being configured to be axially applied to the flange 24a2.

In the illustrated example, the plate 104 itself comprises two portions, respectively upper and lower, and has a T or cross or + shape.

The lower portion of the plate 104 is substantially straight and vertical. This lower portion is considered as a stationary segment as opposed to the upper portion which is movable relative to the lower segment.

The upper portion of the plate comprises two side branches 104a1, 104a2 oriented in opposite directions and whose opposite ends are here connected to each other by the ring sector 110. This ring sector 110 here extends over substantially 180° above these branches 104a1, 104a2.

The plate 104 comprises a lower end 104a3 for connection to the carriage 102 and may comprise an upper end 104a4 also connected to the ring sector 110. The end 104a3 forms part of the stationary segment of the plate 104, and its end 104a4 forms part of the movable segment.

The members 106 are distributed over the ring sector 110. The members are three in number in the example shown. Two members 106 are located at the circumferential ends of the ring sector 110, i.e., at the level of the ends 104a1, 104a2. The last member 106 is located substantially in the middle of the ring sector 110, and thus at the level of the end 104a4.

Figure 18:
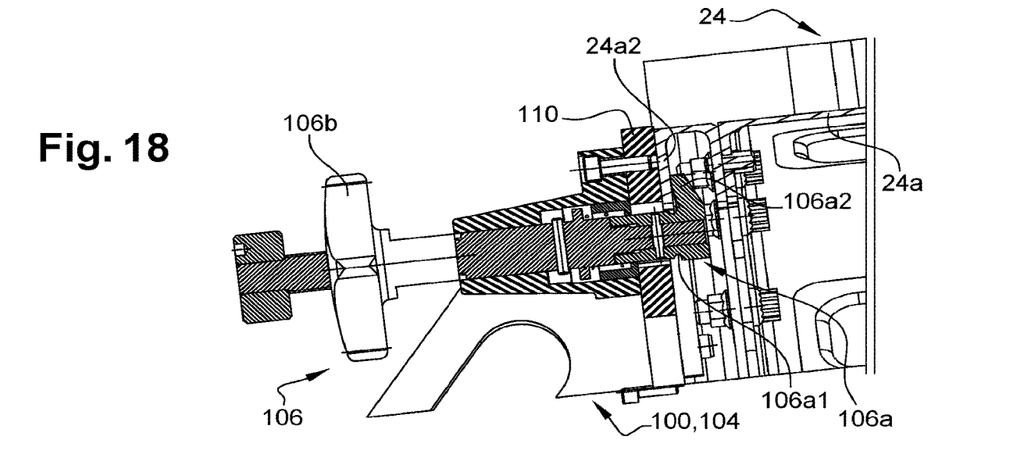
FIG. 18 is a larger scale schematic partial cross-sectional view of a detail of the tool of FIG. 13.

One of these members 106 is shown in detail in FIG. 18. Each of these members 106 comprises a hook 106a which is connected to a knob 106b, and which is movable about an axis B by means of the knob 106b from a first unlocking position to a second position for locking and immobilizing the casing 24. In the position of use, the axis B is substantially parallel to the axis A.

The hook 106a is generally L-shaped and comprises a first branch 106a1 extending along the axis B and configured to be engaged radially within the flange 24a2, and a second branch 106a2 movable from the first position, in which it extends substantially tangentially or radially inwardly with respect to the axis A, to the second position, in which it extends radially outwardly to hold that flange axially tight (see FIG. 18). The flange 14a2 is thus tightened between the hook and the ring sector 110.

The members 108 are two in number here. A first of these members is located in the vicinity of the lower end 104a3 of the body 104a of the plate 104 and is thus supported by the stationary segment of the plate. Another member 108 is located on a side extension of one of the branches 104a2 of the body 104a and is thus supported by the movable segment of the plate.

Each of these members 108 comprises a rod 108a substantially parallel to the axis A and configured to be engaged in a screw passage orifice of the flange 24a2. Due to the position of the members 108, the rods 108a are here spaced apart from each other at an angle of approximately 90° with respect to the axis A.

Figure 17:
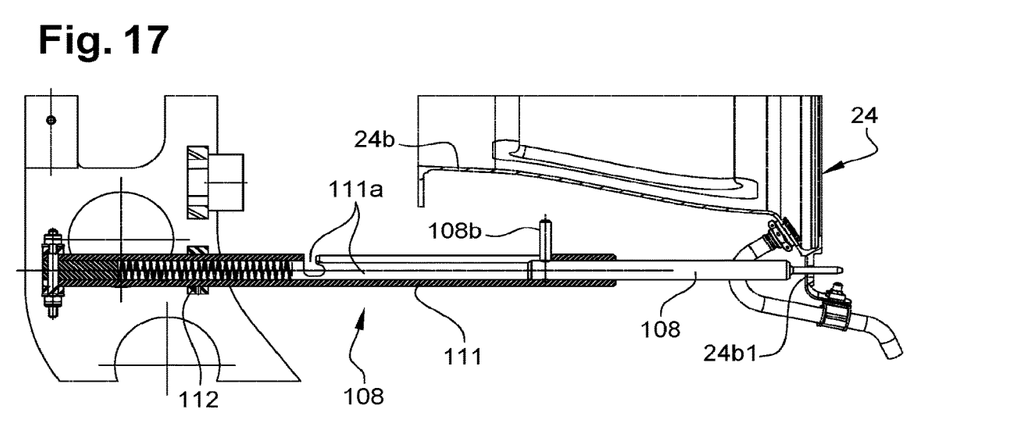
FIG. 17 is a larger scale schematic partial cross-sectional view of a detail of the tool of FIG. 13.

FIG. 17 is a larger scale view of the rod 108a of the member 108 located in the vicinity of the end 104a3. This rod 108a is manually movable in axial translation from an advanced position shown in this figure, to a retracted position, and vice versa. For this purpose and in the example shown, the rod 108a is integral with a finger 108b which cooperates with an L-shaped notch 111a of a sheath 111 carried by the plate 104. The finger 108b cooperates with this notch 111a by bayonet effect, i.e., the finger can be brought to both ends of the notch. It is possible to lock the finger 108 in its retracted position or to hold it in its advanced position, for example by means of a spring 112 housed in the sheath 111.

Figure 19:
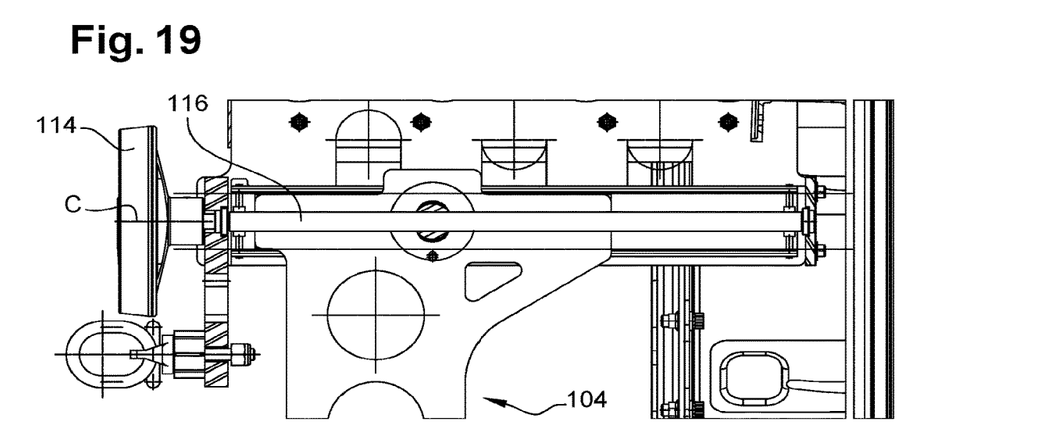
FIG. 19 is a larger scale schematic partial cross-sectional view of a detail of the tool of FIG. 13.

FIG. 19 is a detail view of the plate 104 and in particular of its aforementioned stationary and movable segments. The movable segment may be moved on the stationary segment by means of a handwheel 114 connected to an endless screw 116. The screwing or the unscrewing of the handwheel leads to a translation forward or backward, along the axis C of the screw, of the movable segment on the stationary segment.

Figure 14:
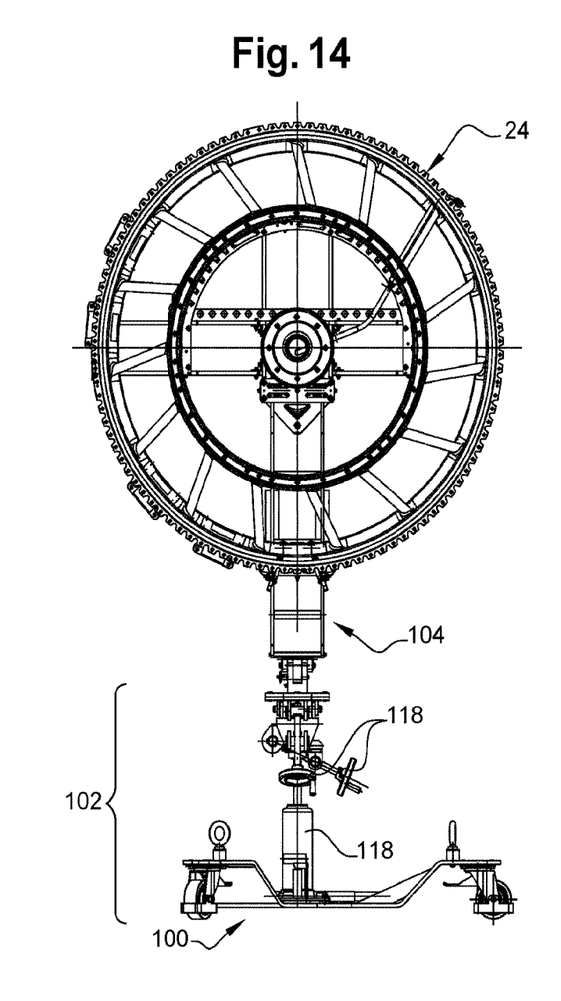
FIG. 14 is a schematic front perspective view of the tool of FIG. 13.

The carriage 102 of the tool is shown in FIGS. 13 and 14. It comprises wheels 120, here three in number, for moving the tool over a floor.

The carriage 102 further comprises adjusting elements 118 of a height of the plate 104 and at least one pivot angle of the plate about an axis. The elements 118 thus allow the height of the plate 104 to be adjusted as well as the tilt angles of the plate, for example with respect to each of the axes of an orthonormal reference frame. As shown in FIGS. 13 and 14, the adjusting element 118 of the height may include rod disposed partially disposed within a cylinder and moveable in a vertical direction to adjust the height of the plate 104. Also shown in FIGS. 13 and 14, the adjusting elements 118 of at least one pivot angle may include one or more threaded rods that are rotatable to adjust the pivot angle of the plate 104 relative to the carriage.

We will now continue with the presentation of the steps of the method for disassembling the turbine casing 24 with reference to FIGS. 8 to 12.

Figure 8:
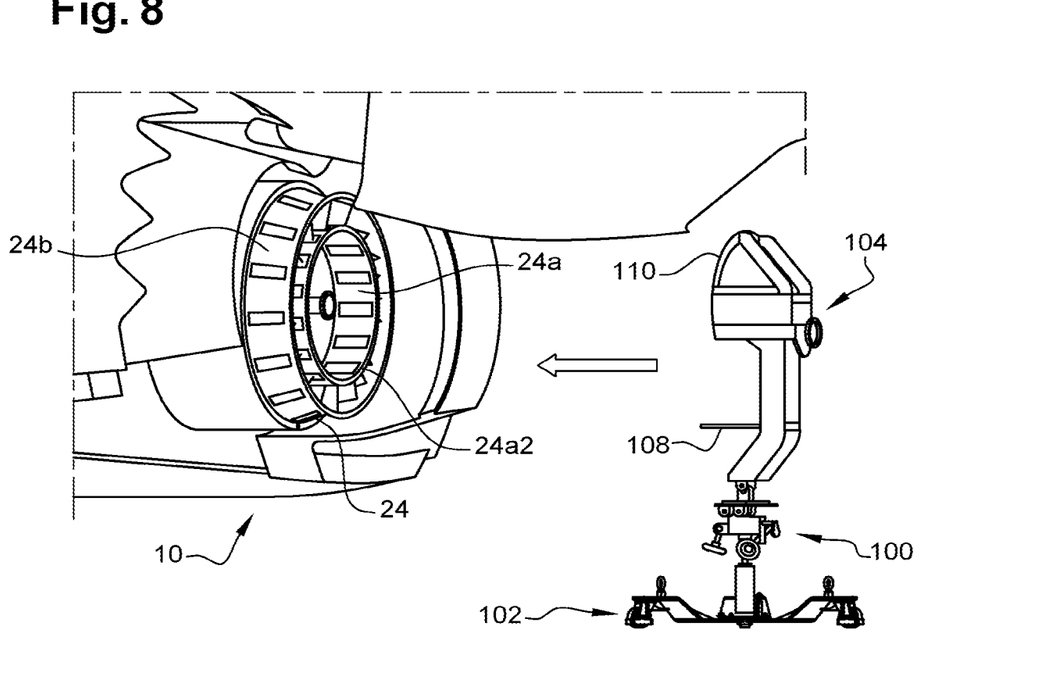
FIG. 8 is a schematic perspective view of the downstream end of the turbine engine of FIG. 4, and shows another step of a disassembling method according to the disclosure.

In FIG. 8, the tool 100 is moved by means of these wheels 120 until downstream of the turbine casing 24.

Figure 9:
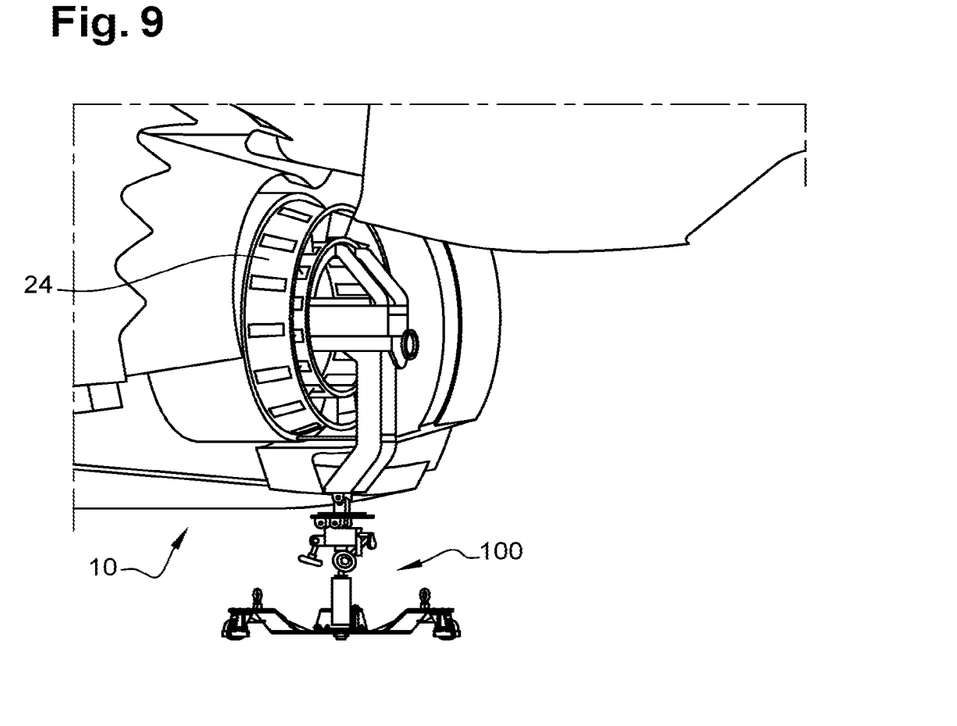
FIG. 9 is a schematic perspective view of the downstream end of the turbine engine of FIG. 4, and shows another step of a disassembling method according to the disclosure.
Figure 10:
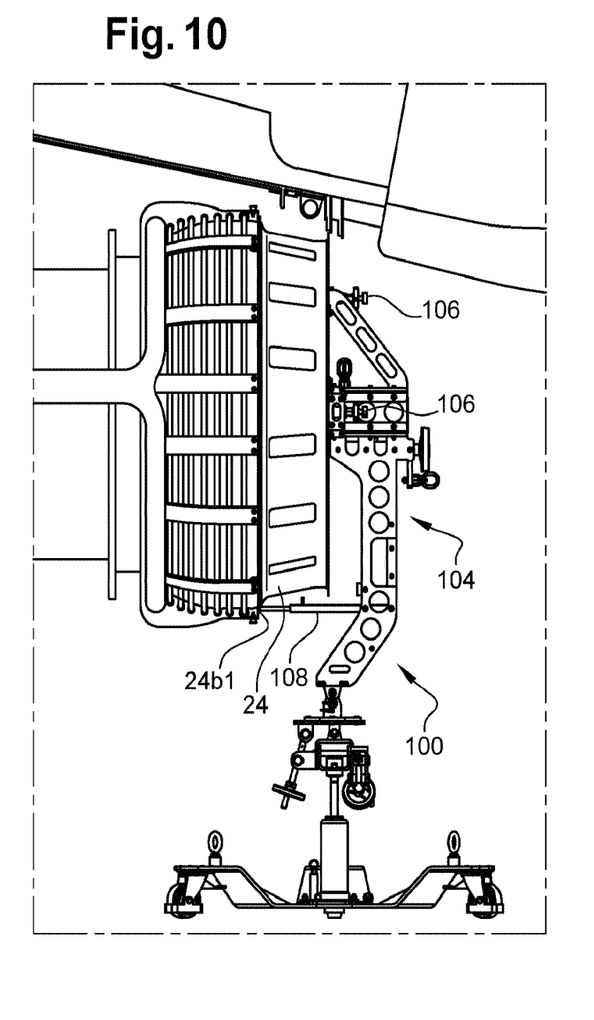
FIG. 10 is another schematic perspective view of the downstream end of the turbine engine of FIG. 4, and shows the step of FIG. 9.
Figure 10A:
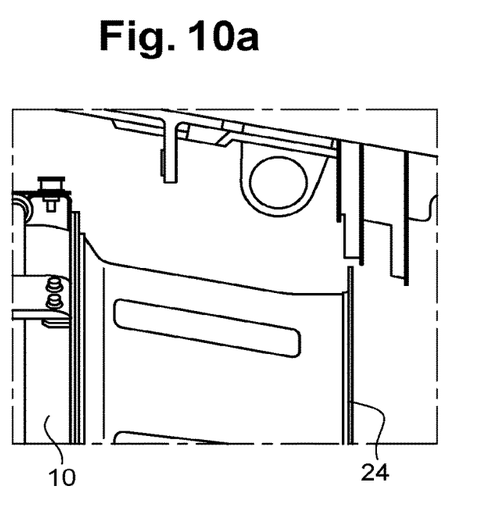
FIG. 10a is an enlarged view of a detail of FIG. 10.

The tool 100 is shown so that the ring sector 110 is applied axially against the flange 24a2 of the internal shell 24a of the casing 24 (FIGS. 9, 10 and 10a). For this purpose, the height and the angular position of the plate 104 with respect to the aforementioned angles may be adjusted by means of the aforementioned elements 108. The carriage 102 may be brought as close as possible to the turbine engine 10 and the approach to the ring sector 110 may be made by means of the aforementioned handwheel 114.

The rods 108a are advanced until their free ends engage in orifices in the flange 24b1 of the external shell 24b. This allows the plate 104 and in particular the ring sector 110 to be centred with respect to the turbine casing 24 (FIGS. 10 and 13).

The members 106 are then manipulated to hold the flange 24a2 axially tight against the ring sector 110. The turbine casing 24 is then engaged to the tool 100 and can be disengaged from the turbine engine 10. The screws for attaching the flanges 24a1, 24b1 are unscrewed and removed. Some of these screws had to be removed beforehand to engage the rods 108a in these orifices.

The turbine casing 24 can then be axially removed from the rest of the turbine engine by axial translation (FIGS. 11 and 12). As illustrated in FIGS. 11 and 11a, the environment of the turbine casing 24 is very constrained and its removal may require a succession of small movements facilitated by the wheels 120 and the adjusting elements 118.

The turbine casing 24 is then removed from the turbine engine 10 and can undergo a maintenance operation before being reassembled, as shown in FIG. 2.

The invention claimed is:

1. A tool for disassembling and moving a TRV-type turbine casing of an aircraft turbine engine, the turbine casing comprising internal and external annular shells, which extend one inside the other and around a same axis and are connected together by arms, the tool comprising:
    a lower carriage configured to move the tool, and
    an upper plate configured to be fastened to the turbine casing the upper plate being supported by the lower carriage and comprising first members configured to cooperate with a first annular flange of one of the internal and external annular shells to support the turbine casing and axially immobilize same with respect to the tool, and second members configured to cooperate with a second annular flange of the other of the internal and external annular shells to rotatably guide and/or block the turbine casing about said axis, the upper plate comprising a lower end connecting to the lower carriage and an upper end connecting to the ring sector, the lower end forming a stationary segment part of the upper plate, the upper end forming part of a movable segment part of the upper plate,
    wherein the first members comprise hooks which are each connected to a knob and movable by the knob from a first unlocking position to a second position for locking and immobilizing the turbine casing, the first members are supported by a ring sector of the upper plate, the ring sector being configured to be applied axially to the first annular flange.

2. The tool according to claim 1, wherein each of the hooks is L-shaped and comprises a first branch parallel to said axis and configured to be engaged radially within the first annular flange and a second branch movable from the first position, in which the second branch extends tangentially or radially inwardly with respect to said axis, to the second position, in which the second branch extends radially outwardly to hold the first annular flange axially tight.

3. The tool according to claim 1, wherein the second members comprise rods parallel to said axis and configured to be engaged in bolt passage orifices of the second annular flange.

4. The tool according to claim 3, wherein tow of the rods are spaced apart from each other by a predetermined angle with respect to said axis.

5. The tool according to claim 4, wherein the predetermined angle is in a range of 90° to 180°.

6. The tool according to claim 1, wherein the movable segment is configured to be translated in a direction parallel to said axis.

7. The tool according to claim 1, wherein the upper portion of the upper end comprises two side branches oriented in opposite directions and whose opposite ends are connected to each other by the ring sector.

8. The tool according to claim 1, wherein the lower carriage is provided with wheels for moving the tool over a floor.

9. The tool according to claim 1, wherein the lower carriage comprises adjusting elements of a height of the upper plate and at least one pivoting angle of the upper plate about an axis.

10. A method for disassembling and moving a TRV-type turbine casing of an aircraft turbine engine, the turbine engine and the turbine casing are located under a wing of an aircraft, the turbine casing comprising internal and external annular shells, which extend one inside the other and around a same axis and are connected together by arms, the method using the tool according to claim 1 and comprising the steps of:
    aligning the upper plate of the tool with the turbine casing, the tool being located on a side of a downstream end of the turbine casing;
    moving the tool towards the turbine casing until the second members of the plate cooperate with a flange of the external shell, in order to rotatably guide and/or block the turbine casing about its axis in relation to the tool;

axially immobilizing the turbine casing on the upper plate by the first members of the tool; and disassembling the casing and removing the turbine casing by moving the tool supporting the turbine casing.

11. The tool according to claim 1, wherein the ring sector extends over 180° above the two side branches.

12. The tool according to claim 1, wherein the ring sector extends at 180° above the two side branches.

13. The tool according to claim 1, wherein the upper plate comprises two first members located at a circumferential ends of the ring sector, and another first member located at the level of the upper end.

14. The tool according to claim 1, wherein the second members comprise two rods spaced apart from each other by a predetermined angle with respect to said axis, and one of the two rods is located in the lower end of the upper plate and the other of the two rods is located on a side extension of one of the two sides.

15. The tool according to claim 3, wherein each of the rods is integral with a corresponding finger that cooperates with an L-shaped notch of a sheath carried by the upper plate.

16. The tool according to claim 1, wherein the tool comprises a handwheel connected to an endless screw, such that the movable segment part is configured to be moved on the stationary segment part by said handwheel.

\* \* \* \* \*